No. 763,856. PATENTED JUNE 28, 1904.
J. C. CHENOT.
CHRISTMAS TREE HOLDER.
APPLICATION FILED OCT. 16, 1903.
NO MODEL.
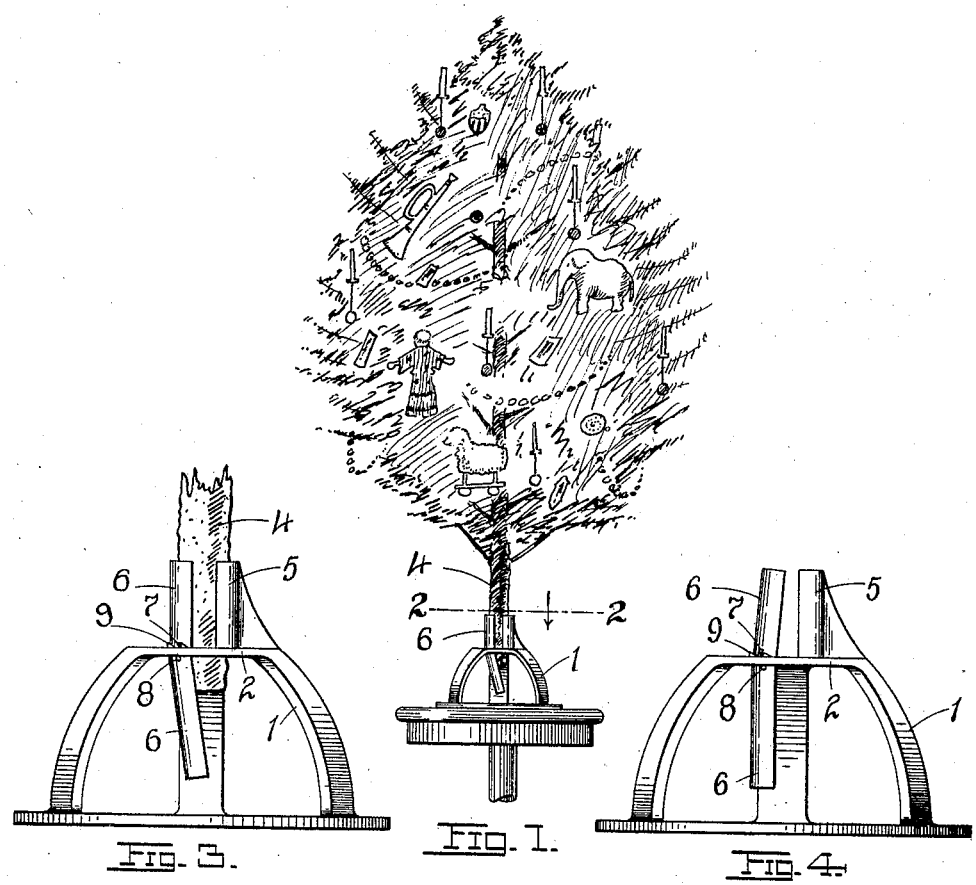
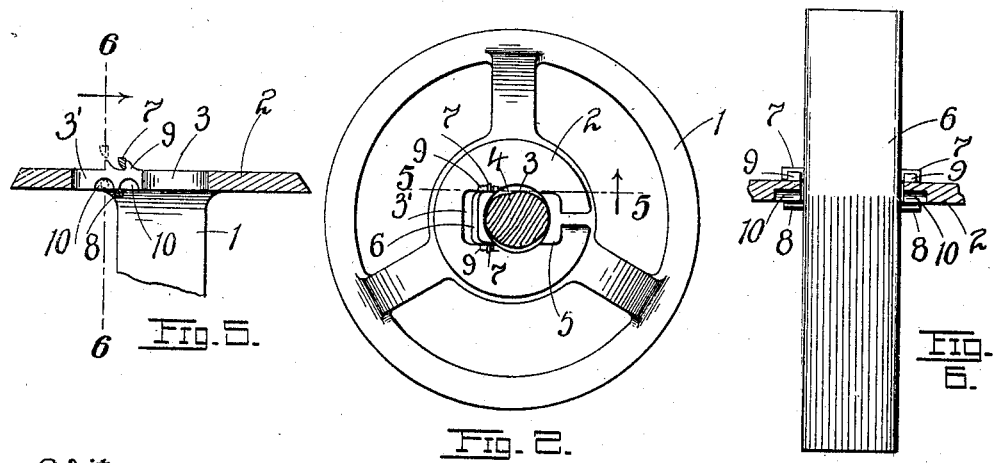
Witnesses
Inventor
John C. Chenot
By Emil Starek
Attorney No. 763,856. Patented June 28, 1904.

UNITED STATES PATENT OFFICE.

JOHN C. CHENOT, OF ST. LOUIS, MISSOURI.

CHRISTMAS-TREE HOLDER.

SPECIFICATION forming part of Letters Patent No. 763,856, dated June 28, 1904.

Application filed October 16, 1903. Serial No. 177,338. (No model.)

*To all whom it may concern:*

Be it known that I, JOHN C. CHENOT, a citizen of the United States, residing at St. Louis, State of Missouri, have invented certain new and useful Improvements in Christmas-Tree Holders, of which the following is a full, clear, and exact description, reference being had to the accompanying drawings, forming a part hereof.

My invention has relation to improvements in Christmas-tree holders; and it consists in the novel construction and combination of parts more fully set forth in the specification and pointed out in the claims.

In the drawings, Figure 1 is a side elevation of the holder applied to a tree. Fig. 2 is a horizontal section on line 2 2 of Fig. 1. Fig. 3 is an enlarged side elevation showing the stem of the tree inserted into the holder. Fig. 4 is a side elevation of the holder before it is brought into service. Fig. 5 is a sectional detail on the line 5 5 of Fig. 2, showing the position of the trunnions and guard-pins relatively to the ridges and depressions of the platform; and Fig. 6 is a vertical cross-section on the line 6 6 of Fig. 5.

The object of my invention is to construct a holder for Christmas trees which shall be simple, effective, cheap, and durable, one capable of operation without the employment of springs, one readily adjusted to different thicknesses of stems or trunks, and one possessing further and other advantages better apparent from a detailed description of the invention, which is as follows.

Referring to the drawings, 1 represents a suitable base, having an upper platform 2, in which is formed an opening 3 for the free insertion of the stem or trunk 4 of the tree. Formed adjacent to the opening 3 and projecting a suitable distance beyond or above the surface of the platform 2 is an abutment 5, and forming an extension of the circular opening 3 opposite said abutment is a recess 3', between whose sides is adapted to be freely suspended the bent gripping-lever 6, whose axis of suspension is at the bend formed in said lever and above the center of gravity of the lever, (the long arm of course being the heavier of the two). The lever swings on the trunnions 7 and normally hangs in the position indicated in Fig. 4—that is to say, with the short arm inclined or deflected toward the abutment 5. The moment, however, that the stem 4 is inserted between said short arm of the lever and the abutment 5 the insertion at once tilts the lever to the position indicated in Fig. 3—that is to say, the short or upper arm of the lever tilts away and substantially to a position parallel to the abutment 5, the lower arm of the lever being forced inwardly or in the path of the stem 4. The latter thus bearing against the now inclined surface of the lower arm tends to force the upper arm against the portion of the stem which is above the platform 2, whereby the tree-stem becomes wedged tightly between the upper arm of the lever 6 and abutment 5, and the more forcibly the tree is driven downward the tighter will be the grip of the parts 5 and 6.

To prevent the gripping-lever from accidental dislodgment from below, I provide it with the guard-pins 8, located substantially below the trunnions 7, the trunnion and pin on either side embracing the sides of the recess 3', within which the lever is suspended. The trunnions rest on either side of or between a series of ridges 9, which will allow for the proper adjustment of the axis of suspension of the lever to and from the abutment 5 to accommodate stems or tree-trunks of different thicknesses. Thus when the lever hangs suspended from a point between the ridges 9, as seen in Fig. 5, it accommodates the insertion of a trunk or stem of one thickness. When the lever is shifted to bring its trunnions outside the exterior pair of ridges 9, it accommodates a larger trunk, and when shifted to bring its trunnions interior to the inner pair of ridges it accommodates a trunk of minimum dimensions. To shift the lever from one point of suspension to another, the trunnions are shoved along the ridges until the proper adjustment is secured; but as each trunnion and its corresponding guard-pin 8 are spaced just sufficiently apart to loosely embrace the thickness of the platform 2 on either side of the recess 3' I provide the under surface of the platform at points opposite each ridge 9 with depressions 10, which allow for the raising of the pins 8 as the trunnions ride over the ridges in effecting the adjustment referred to. (See dotted position, Fig. 5.) The curvatures of the inner adjacent faces of the lever 6 and abutment 5 preferably conform to that of the circular opening 3, so that the stem 4 may be embraced along a maximum surface of contact.

Apparently the present construction may be departed from in minor details without affecting the nature or spirit of my invention. It is also apparent that while the device is specifically denominated as a "Christmas-tree holder" it may be used for supporting the staff or stem of any other article, and naturally its use need not be restricted to the support of Christmas trees.

Having described my invention, what I claim is—

1. A holder comprising a suitable platform having an opening formed therein and a recess communicating with said opening, an abutment adjacent to said opening located opposite said recess and projecting above the platform, and a bent lever suspended within the recess adjacent to said opening, and adapted to have one arm forced against a stem inserted through the opening while the stem is bearing against the opposite arm of the lever, substantially as set forth.

2. A holder comprising a suitable platform having an opening formed therein, and a recess communicating with said opening, a rigid abutment located adjacent to the opening opposite said recess, a bent lever suspended within the recess and normally hanging with its lower arm parallel to the abutment and with its upper arm bent toward the abutment, the lower arm being adapted to be impinged against by the end of a stem inserted through the opening, the lever under the circumstances being actuated to force the upper arm against the stem, and forcibly hold the same between such arm and the abutment, substantially as set forth.

3. A holder comprising a suitable platform having an opening formed therein and a recess communicating with said opening, a rigid abutment located adjacent to said opening opposite said recess, a series of ridges on the upper surface of the platform on each side of the recess, a corresponding series of depressions on the under surface of the platform, a bent lever adapted to be suspended between the sides of the recess, trunnions for the support of said lever located at the bend formed in the lever, and guard-pins on the lever for engaging the under surface of the sides of the recess, the lever normally hanging suspended with its upper arm deflected or bent toward the abutment, the parts operating substantially as, and for the purpose set forth.

4. In a holder, a suitable platform having an opening formed therein and a recess communicating with said opening for the reception of a swinging lever, an abutment located adjacent to the opening opposite the recess, the swinging lever being adjustable in said recess to and from the abutment, substantially as set forth.

In testimony whereof I affix my signature in presence of two witnesses.

JOHN C. CHENOT.

Witnesses:
 EMIL STAREK,
 G. L. BELFRY.